United States Patent [19]
Herbst

[11] Patent Number: 5,785,080
[45] Date of Patent: Jul. 28, 1998

[54] PRESSURE-REGULATING VALVE

[75] Inventor: Kurt Herbst, Burgstetten, Germany

[73] Assignee: Robert Bosch GmbH, Stuttgart, Germany

[21] Appl. No.: 549,708

[22] PCT Filed: Mar. 3, 1995

[86] PCT No.: PCT/DE95/00287

§ 371 Date: Nov. 15, 1995

§ 102(e) Date: Nov. 15, 1995

[87] PCT Pub. No.: WO95/25235

PCT Pub. Date: Sep. 21, 1995

[30] Foreign Application Priority Data

Mar. 17, 1994 [DE] Germany ............... 44 09 133.8

[51] Int. Cl.$^6$ ..................... G05D 16/08; F16K 27/00
[52] U.S. Cl. ............................. 137/510; 123/463
[58] Field of Search ............. 137/510; 123/456, 123/463

[56] References Cited

U.S. PATENT DOCUMENTS

| 4,284,039 | 8/1981 | Bellicardi et al. | 137/510 |
| 4,505,296 | 3/1985 | Field | 137/510 |
| 4,883,088 | 11/1989 | Herbst | 137/510 |
| 5,275,203 | 1/1994 | Robinson | 137/510 |

FOREIGN PATENT DOCUMENTS 2173883  10/1986  United Kingdom.

Primary Examiner—Stephen M. Hepperle
Attorney, Agent, or Firm—Edwin E. Greigg; Ronald E. Greigg

[57] ABSTRACT

The pressure-regulating valve is provided with a cap which is formed by a tubular lower part made of plastic and a cup-shaped upper part made of plastic. The lower part and the upper part partially overlap, as a result of which it is possible to modify the force of the compression spring, which acts on the upper part, by displacing the upper part Once the spring force has been set, the lower part and the upper part are fixed relative to one another. The pressure-regulating valve is particularly suitable for use in fuel supply systems.

4 Claims, 3 Drawing Sheets

5,785,080

1

PRESSURE-REGULATING VALVE

PRIOR ART

The invention relates to a pressure-regulating valve for a fuel supply system of an internal combustion engine. There is already a known pressure-regulating valve (DE 28 16 479 A1) in which the valve housing is formed from deep-drawn sheet-metal parts and the top of the valve cap against which the compression spring acting in the closing direction of the pressure-regulating valve rests is deformed to set the force of said compression spring. It is a disadvantage here that the deformation of the sheet metal to produce the valve housing is very involved and hence entails high costs.

ADVANTAGES OF THE INVENTION

In contrast, the pressure-regulating valve according to the invention has the advantage that it allows precise setting of the spring force despite the use of plastic as the material for the cap.

Advantageous developments and improvements of the pressure-regulating valve specified herein are made possible by the measures presented hereinafter.

BRIEF DESCRIPTION OF THE DRAWINGS

Exemplary embodiments of the invention are illustrated in simplified form in the drawing and explained in greater detail in the following description.

DESCRIPTION OF THE EXEMPLARY EMBODIMENTS

Figure 1:
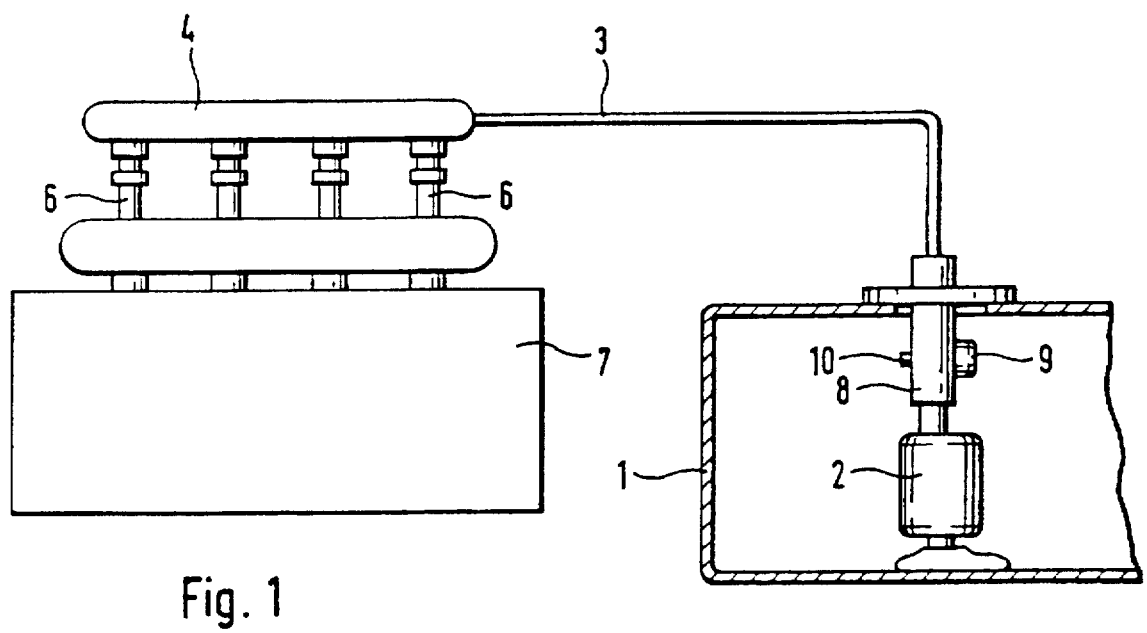
FIG. 1 shows a schematic illustration of a fuel supply system of an internal combustion engine.

In FIG. 1, 1 denotes a fuel tank in which is arranged a fuel pump 2 that is driven, for example, by an electric motor and pumps fuel into a fuel line 3. The fuel line 3 opens into a "fuel rail" 4, from which fuel enters injection valves 6 inserted into the fuel rail 4. The injection valves 6 are each inserted by their injection ends into a respective individual intake pipe of a cylinder of a mixture-compressing, applied-ignition internal combustion engine 7 and spray fuel in the immediate vicinity of the inlet valves of the individual cylinders. Arranged between the fuel pump 2 and the fuel line 3 is a holding body 8 by means of which the fuel delivered by the fuel pump flows to the fuel line 3 and which serves to hold a pressure-regulating valve 9. The holding body 8 is preferably situated directly on the fuel tank 1 or, together with the pressure-regulating valve 9, within the fuel tank, allowing fuel discharged by the pressure-regulating valve 9 to flow back directly into the fuel tank 1 via a return connection 10. The fuel supply system described corresponds to the so-called returnless system, in which the excess fuel which is delivered by the fuel pump 2 but not injected by the injection valves 6 is returned to the fuel tank 1 directly downstream of the fuel pump, via the pressure-regulating valve 9. The advantage of this arrangement is that no additional fuel lines are required to return the fuel which is not injected at the injection valves from the fuel rail 4 to the fuel tank 1, these lines being exposed to the risk of damage. It is also advantageous that the pressure-regulating valve 9 is arranged in a protected location in the fuel tank 1 and that the fuel returned to the fuel tank via the pressure-regulating valve is not subject to the heat in the engine compartment of the motor vehicle and thus remains cool, thereby reducing unwanted heating of the fuel delivered by the fuel pump and hence the risk that vapor bubbles will occur in the fuel supply system.

Figure 2:
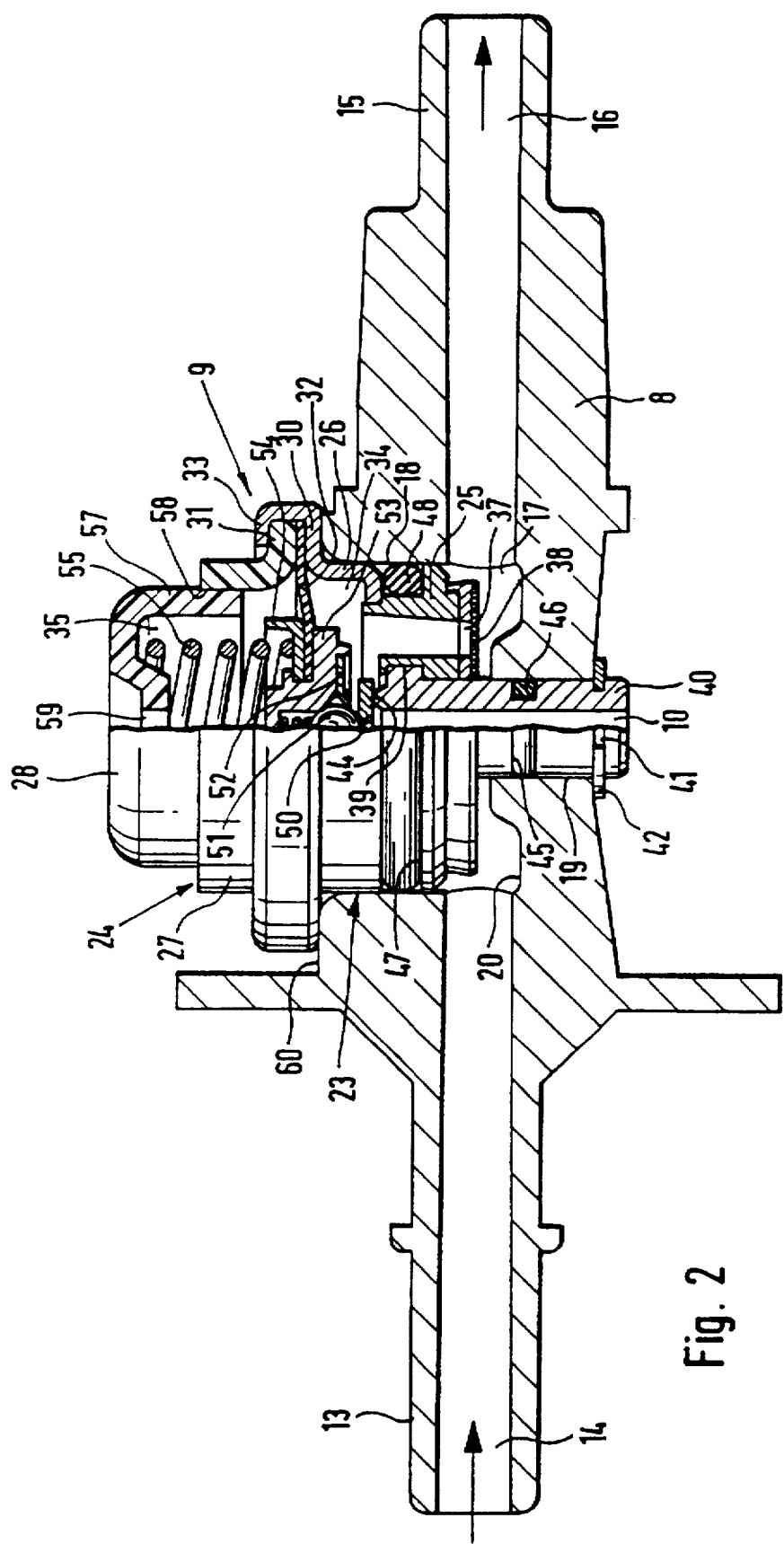
FIG. 2 shows a first exemplary embodiment of a pressure-regulating valve according to the invention.

FIG. 2 shows a holding body 8, which can be manufactured from a metallic or nonmetallic material such as plastic. The holding body 8 has an inflow stub 13 with an inflow passage 14 and an outflow stub 15 with an outflow passage 16. Likewise formed in the holding body is a cylindrical location opening 17 which runs transversely to the inflow passage 14 and the outflow passage 16 and at which the inflow passage 14 ends and the outflow passage 16 begins. The location opening 17 is of stepped design and has a first step section 18 which has a larger diameter than a second step section 19. The transition from the first step section 18 to the second step section 19 of smaller diameter is accomplished by means of a bottom section 20 at which the second step section 19 begins and extends as far as the outer surface of the holding body 8 remote from the first step section 18.

The pressure-regulating valve 9 is inserted into the location opening 17 and fixed on the holding body. The pressure-regulating valve 9 has a main body 23 and a cap 24. In the exemplary embodiment shown in FIG. 2, the main body 23 is formed by a bottom part 25 and an intermediate part 26. The cap 24 is formed by a tubular bottom part 27 and a cup-shaped top part 28. Adjacent to one another, the intermediate part 26 has an outwardly directed shoulder 30 and the tubular bottom part 27 has a collar 31, between which a flexible diaphragm 32 is clamped by means of a flanged rim 33 adjoining the shoulder 30 and overlapping the collar 31. The diaphragm 32 separates a fuel chamber 34 additionally bounded by the bottom part 25 and the intermediate part 26 from a spring chamber 35 additionally bounded by the bottom part 27 and the top part 28. The bottom part 25 is penetrated in the axial direction by at least one inflow opening 37, via which fuel can flow from the location opening 17 into the fuel chamber 34. A screen 38 which extends in the radial direction across the bottom part and the inflow opening or openings 37 is fixed on that end face of the bottom part 25 which faces the bottom section 20 of the location opening 17. The bottom part 25 has a stepped retaining hole 39 which extends in the axial direction and into which an outflow stub 40 provided with a shoulder is pressed, the stub also being held, for example, by a bent edge in the retaining hole 39. The outflow stub 40 projects outwards through the bottom part 25 and through the second step section 18 of the location opening 17. The circumference of that end of the outflow stub 40 which projects from the second step section 19 has formed in it a groove 41 into which a snap ring 42 is snapped, the latter projecting radially beyond the cross section of the second step section 19 and thus preventing the pressure-regulating valve 9 from falling out of the location opening 17. The shoulder 30 of the intermediate part 26 projects radially beyond the cross section of the first step section 18 of the location opening 17 and rests on a supporting surface 60 of the holding body 8. In the outflow stub 40 is formed the return connection 10, which begins at a valve seat 44 formed on the outflow stub 40 and leads to the fuel chamber 34. The circumference of the outflow stub 40 has formed in it a sealing groove 45 which is open towards the second step section 19 and in which is arranged a sealing ring 46 that rests on the second step section 19.

On its circumference, the bottom part 25 has a sealing groove 47 which accommodates a sealing ring 48 that rests on the first step section 18. In contrast to the bottom part, which is designed as a rigid, solid body, the intermediate part 26 is made of sheet metal, as a deep-drawn part for example, and is welded or brazed to the circumference of the bottom part. The valve seat 44 can be opened or closed by a valve plate 50 which is rigidly connected to a ball 51. The ball 51 is mounted in such a way in a rivet element 53 by means of a retaining clip 52 that it can rotate in all directions in the rivet element. The rivet element 53 reaches in a sealed manner through the diaphragm 32 and, at its end projecting into the spring chamber 35, is rivetted to a spring plate 54 which rests on the diaphragm and on which there rests a compression spring 55 which loads the diaphragm 32 and the valve plate 50 towards the valve seat 44. At the end remote from the spring plate 54, the compression spring 55 is supported on the cup-shaped upper part 28. The cup-shaped upper part 28 engages in sliding fashion by means of its cylindrical rim 57 into a guide opening 58 in the tubular lower part 27 and can be pushed down into the lower part in the axial direction until the force of the compression spring 55 corresponds to the force required to set a predetermined fuel pressure in the fuel supply system, so that, when the fuel pressure in the fuel supply system is exceeded, the pressure-regulating valve 9 opens and fuel can flow back to the fuel tank 1 via the return connection 10. Provided in the cup-shaped upper part 28 is an air connection 59 which establishes either a connection between the spring chamber 35 and the atmosphere or, in a manner not shown, the air intake pipe of the internal combustion engine 7 downstream of a throttle valve. This results in a dependence of the regulated fuel pressure on the atmospheric pressure or the air pressure in the intake pipe of the internal combustion engine. The lower part 27 and the upper part 28 of the cap 24 are each manufactured from plastic, and, on completion of the setting operation for the purpose of setting the force of the compression spring, these two plastic components 27, 28 are thus fixed relative to one another, by welding or adhesive bonding for example. The lower part 27 and the upper part 28 can also be provided with a thread, adjustment of these two components relative to one another thus being performed by means of a turning movement. As an equivalent solution, it is, of course, also possible for the upper part 28 to fit partially over the lower part in sliding fashion with its cylindrical rim 57, i.e. for the lower part 27 to project partially into the upper part 28.

Figure 3:
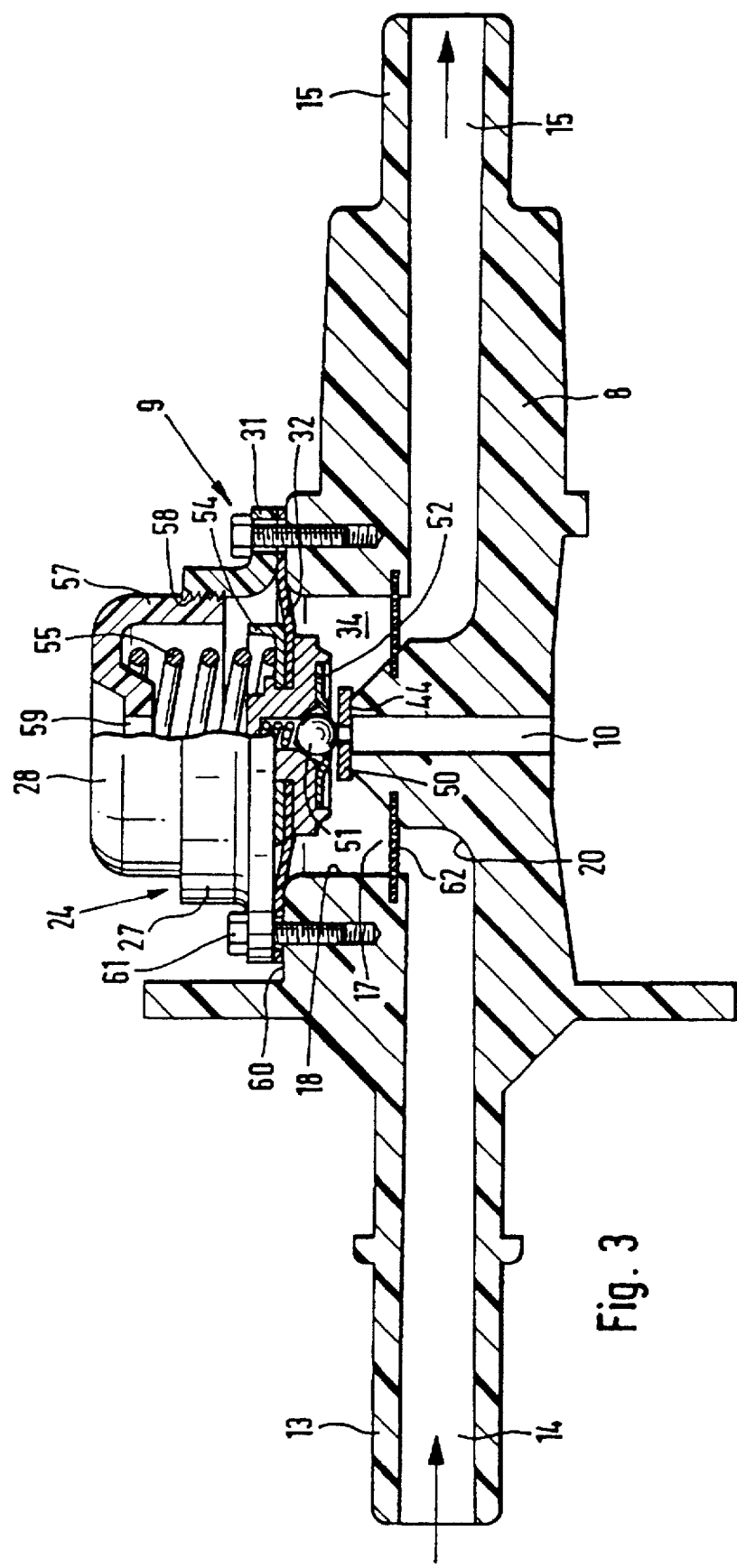
FIG. 3 shows a second exemplary embodiment of a pressure-regulating valve according to the invention.

FIG. 3 shows a second exemplary embodiment, in which those parts which are the same and have the same action as in the exemplary embodiment shown in FIG. 2 are distinguished by the same reference numerals. In contrast to the exemplary embodiment shown in FIG. 2, the holding body 8 in the exemplary embodiment shown in FIG. 3 also has the function of the main body 23 of the pressure-regulating valve 9. In this arrangement, the diaphragm 32 rests on the supporting surface 60 of the holding body 8 and covers the stepped location opening 17 of the holding body 8. The collar 31 of the lower part 27 engages on the diaphragm 32 on the side opposite the supporting surface 60. The cap 24 and the diaphragm 32 are screwed to the holding body 8 serving as a main body by means of the collar 31 and screws 61 which pass through the diaphragm 32. The valve seat 44 of the pressure-regulating valve is formed on the bottom section 20 of the location opening 17, through which bottom section also the return connection 10 runs. The fact that the holding body 8 is made of plastic makes it possible, during the production of the main body 8, for a screen 62 to be molded by its circumference into the wall of the first step section 18 and by a radially inner rim into the wall of the bottom section 20 in such a way that fuel can pass out of the inflow passage 14 into the fuel chamber 34 only via the screen 62 and, in turn, from the fuel chamber 34 to the outflow passage 16 only via the screen 62. The lower part 27 and the upper part 28 are nested in one another in the manner already described with reference to FIG. 2 and can be displaced axially relative to one another to set the force of the compression spring 55 and then fixed relative to one another.

The foregoing relates to preferred exemplary embodiments of the invention, it being understood that other variants and embodiments thereof are possible within the spirit and scope of the invention, the latter being defined by the appended claims.

What is claimed is:

1. A pressure-regulating valve for fuel supply systems of internal combustion engines, comprising a cap and a main body, said cap includes a plastic tubular lower part (27) and a plastic cup-shaped upper part (28), said tubular lower part (27) or said cup-shaped upper part (28) is forced at least partially into one end of one of said parts and is connected thereto so that a portion of the cup-shaped upper part extends outwardly of said tubular lower part, a diaphragm clamped between one end of said tubular lower part of the cap and the main body at a circumference of said diaphragm, a compression spring which is supported at one end on said cup-shaped upper part of the cap and includes another end which acts on the diaphragm in a direction of a valve seat, the compression spring (55) rests on an inner surface of the cup-shaped upper part (28), and the tubular lower part (27) and the cup-shaped upper part (28) are welded together subsequent to being pushed together.

2. A pressure-regulating valve for fuel supply systems of internal combustion engines, comprising a cap and a main body, said cap includes a plastic tubular lower part (27) and a plastic cup-shaped upper part (28), said tubular lower part (27) or said cup-shaped upper part (28) is forced at least partially into one end of one of said parts and is connected thereto so that a portion of the cup-shaped upper part extends outwardly of said tubular lower part, a diaphragm clamped between one end of said tubular lower part of the cap and the main body at a circumference of said diaphragm, a compression spring which is supported at one end on said cup-shaped upper part of the cap and includes another end which acts on the diaphragm in a direction of a valve seat, the compression spring (55) rests on an inner surface of the cup-shaped upper part (28), and the lower tubular part (27) and the upper cup-shaped part (28) are screwed together.

3. A pressure-regulating valve for fuel supply systems of internal combustion engines, comprising a cap and a main body, said cap includes a plastic tubular lower part (27) and a plastic cup-shaped upper part (28), said tubular lower part (27) or said cup-shaped upper part (28) is forced at least partially into one end of one of said parts and is connected thereto so that a portion of the cup-shaped upper part extends outwardly of said tubular lower part, a diaphragm clamped between one end of said tubular lower part of the cap and the main body at a circumference of said diaphragm, a compression spring which is supported at one end on said cup-shaped upper part of the cap and includes another end which acts on the diaphragm in a direction of a valve seat, the compression spring (55) rests on an inner surface of the cup-shaped upper part (28), the main body (8) is made of plastic and has an inflow stub (13), an outflow stub (15) and a return connection (10), wherein the valve seat (44) is formed in the main body (8), and a screen (62) is embedded along a circumference in the main body (8), between the inflow stub (13) and the valve seat (44) and between the valve seat (44) and the outflow stub (15).

4. A pressure regulating valve as claimed in claim 3, wherein said tubular lower and said cup-shaped upper part of said cap are made of plastic.

* * * * *